Dec. 30, 1958      D. L. SHANKS      2,866,295
HOLDER FOR FISHING TACKLE

Filed Dec. 29, 1955      3 Sheets-Sheet 1

Inventor
Donald L. Shanks
By Harold E. Cole
Attorney

Dec. 30, 1958                D. L. SHANKS                2,866,295
                        HOLDER FOR FISHING TACKLE
Filed Dec. 29, 1955                                    3 Sheets-Sheet 2
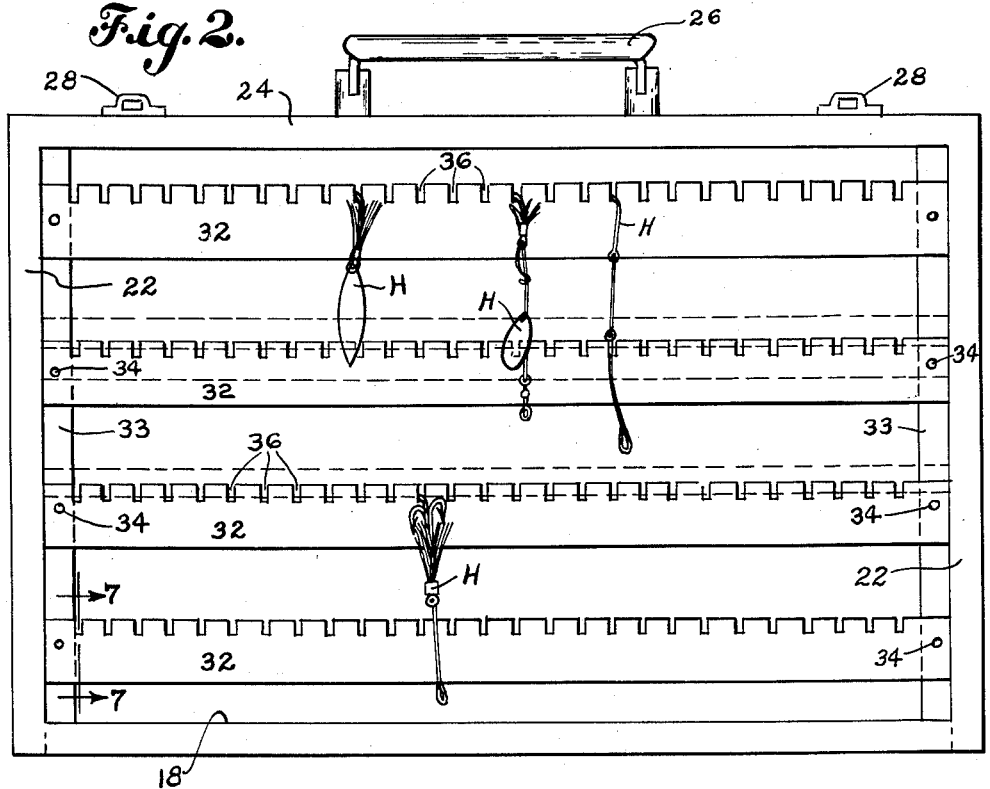
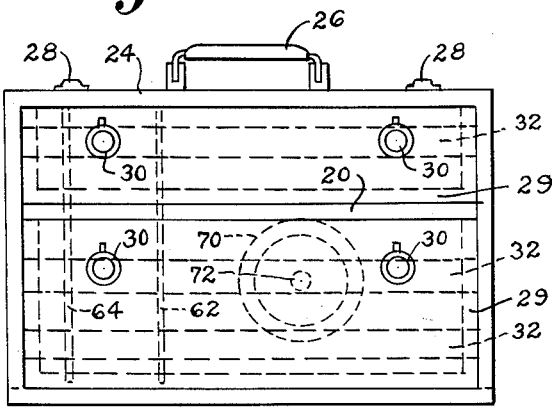

Dec. 30, 1958     D. L. SHANKS     2,866,295
HOLDER FOR FISHING TACKLE
Filed Dec. 29, 1955     3 Sheets-Sheet 3
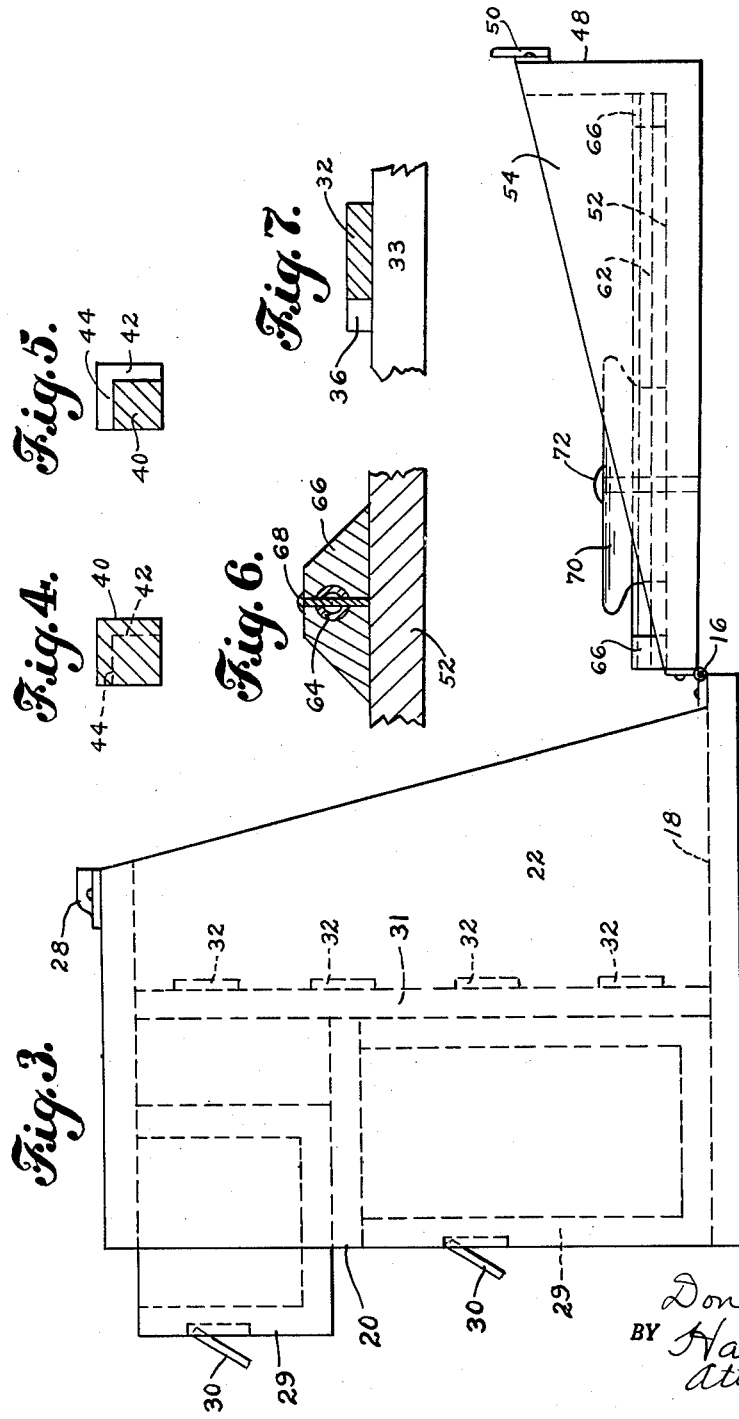
INVENTOR.
Donald L. Shanks
BY Harold E. Cole
Attorney

2,866,295
HOLDER FOR FISHING TACKLE

Donald L. Shanks, Abington, Mass.

Application December 29, 1955, Serial No. 556,307

4 Claims. (Cl. 43—57.5)

This invention relates to a receptacle to hold and carry fishing tackle.

One object of invention is to provide a holder to maintain many kinds of fishing tackle in a predetermined position.

Another object is to provide improved racks whereby fish hooks may be safely held in a predetermined position.

A further object is to provide an improved arrangement of rack and retainer member, to hold and carry leaders with fish hooks, in safe positions, without risk of entanglement and this applies to long leaders and short ones.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawing nor to the particular parts described in the specification; but am entitled to all such changes therefrom as fall within the scope of my claims.

In the drawing:

Fig. 2 is a front elevational view of said receptacle, said cover being omitted.

Fig. 3 is a side elevational view of said receptacle showing the cover in open position, and a drawer in said receptacle partly open.

Fig. 4 is an enlarged sectional view taken on the line 4—4 of Fig. 1.

Fig. 5 is an enlarged, sectional view taken on the line 5—5 of Fig. 1.

Fig. 6 is an enlarged, sectional view taken on the line 6—6 of Fig. 1.

Fig. 7 is an enlarged, sectional view taken on the line 7—7 of Fig. 2.

Fig. 8 is a front elevational view of my holder in the form of a closed receptacle with handle.

Figure 1:
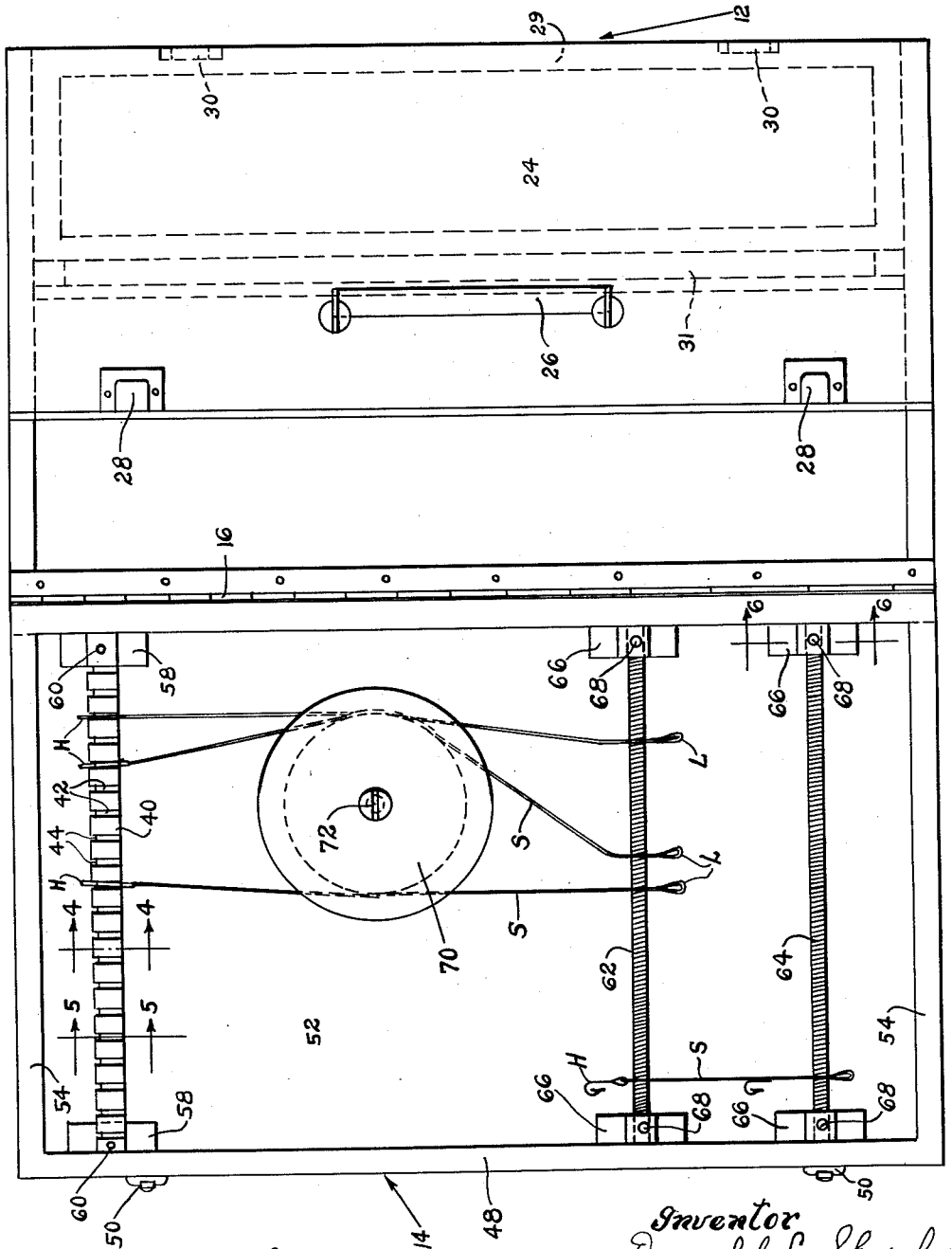
Fig. 1 is a top plan view of my holder for fishing tackle, showing a receptacle, with a cover in open position.

As illustrated, a receptacle is shown having a main container 12 and a cover 14 hinged thereto as at 16. Said main container 12 has a bottom 18, a back portion 20, two sides 22 and a top 24. A handle 26 is attached to said top and also well known snap closure members 28. Drawers 29, having finger pulls 30, slidably extend from said back portion 20 into the interior of said container where they meet a partition 31.

In order to safely and securely hold fish hooks H, I provide racks having notches therein to receive the curved part of the hook. There are racks 32 mounted in the main container 12 that are attached to supports 33 by screws 34 adjacent each said side 22. Said racks 32 may be one inch wide and one-eighth inch thick, for instance, and they have notches 36 cut, or otherwise made therein, extending entirely across the top in position of use, and about one-fourth inch downwardly, for instance. The curved portions of hooks H rest on a said rack 32 at the bottom of said notches 36, hence the hooks hang downwardly when a rack 32, shown in Fig. 2, is in normal position, with the container 12 resting on said bottom 18.

Another form of rack is shown in said Fig. 1. This rack 40 could be one-half inch thick, and it has a notch 42 about one-eighth inch deep extending across the top of said rack, in position of use, and another notch 44 extending across one side thereof, in position of use. Said notches 42 and 44 communicate with each other and a curved portion of a fish hook lies in said notch 44, with the pointed end under said rack, and part of the hook extends across said notch 42.

Said cover 14 for said container 12 has a top 48 with closure members 50 that cooperate with said closure members 28 to securely fasten the cover on said container. Said cover 14 has a main supporting member 52 that serves as a front for the receptacle when the cover is in closed position. Two sides 54 are attached to and partly surround said supporting member 52.

Two supporting blocks 58 are attached to said support 52, and said rack 40 is held thereto by screws 60 which extend through the rack and also through said blocks 58 into said support 52. This holds said rack 40 spaced from the support.

Two retainer members, shown as coil springs 62 and 64, spaced apart, each extend across said support 52 in parallel arrangement, being attached to blocks 66 by screws 68 that extend through them into said support 52.

A spool 70 is attached to said support 52 by a screw 72, being located between said rack 40 and the nearest said retainer member 62 and spaced laterally from both.

Important parts of fishing tackle are leaders, which, as shown, include a hook H, a length of gut or string S and a loop L. The hook H is attached to said rack 40 by extending it into said notches 42 and 44, and a string S extends from said hook to a said retainer member 62 or 64, being held between spring convolutions of the latter, preferably at said loop L. If the string S is quite short, then one end portion can be attached to said retainer member 62 and the other end portion, with loop L, attached to said retainer member 64. If the string S is especially long, the extra length is wound around said spool 70 until only enough remains free to reach and be fastened to said retainer member 62.

Since said retainer members 62 and 64 will receive any portion of said string S, the leaders can always be held sufficiently taut to keep said hooks H in the notches in said rack 40.

Said racks 32 are spaced inwardly from the front of said container 12, and said rack 40, retainer members 62 and 64, and said spool 70, when said cover 14 is closed, enter said space in said container 12 that is forward of said racks 32, permitting said cover 14 to be tightly closed.

What I claim is:

1. A receptacle for fishing tackle comprising a container that is open at the front, a cover for said container that closes said front, means movably holding said cover to said container, said container embodying a rack extending between opposite sides thereof, supporting means for said rack attached to said container, said rack having a notch therein, said cover embodying a rack extending at a right angle to said container rack, said cover rack having a notch therein, means attaching said cover rack to said cover, and a retainer member supported by and extending across said cover and spaced from said cover rack.

2. A receptacle for fishing tackle comprising a container that is open at the front, a cover for said container that closes said front, means movably holding said cover to said container, said container embodying a rack extending between opposite sides thereof and spaced rearwardly from the front of said container, supporting means for said rack attached to said container, said rack having a notch therein, said cover embodying a rack extending at a right angle to said container rack, said cover rack having a notch therein, means attaching said cover rack to said cover, and a retainer member supported by and extending across said cover and spaced from said cover rack, said cover rack and retainer member being so positioned that they enter said space in front of said rack in said container.

3. A receptacle for fishing tackle comprising a container that is open at the front, a cover for said container that closes said front, means movably holding said cover to said container, said container embodying a rack extending between opposite sides thereof, supporting means for said rack attached to said container, said rack having a notch therein, said cover embodying rack extending at a right angle to said container rack, said cover rack having a notch therein, means attaching said cover rack to said cover, a retainer member supported by and extending across said cover and spaced from said cover rack, and a spool attached to said cover and located laterally intermediate said cover rack and said retainer member.

4. A receptacle for fishing tackle comprising a container that is open at the front, a cover for said container that closes said front, means movably holding said cover to said container, said container embodying a rack extending between opposite sides thereof, supporting means for said rack attached to said container, said rack having a notch therein, said cover embodying a rack having a notch therein, means attaching said cover rack to said cover, and a retainer member supported by and extending across said cover and spaced from said cover rack.

References Cited in the file of this patent

UNITED STATES PATENTS

| | | |
|---|---|---|
| 333,384 | Bray | Dec. 29, 1885 |
| 952,314 | Ellsworth | Mar. 15, 1910 |
| 1,490,370 | Figley | Apr. 15, 1924 |
| 2,604,720 | Woodward | July 29, 1952 |
| 2,750,706 | Seals | June 19, 1956 |